(12) United States Patent
Kuehnle et al.

(10) Patent No.: US 10,336,243 B1
(45) Date of Patent: Jul. 2, 2019

(54) APPARATUS AND METHOD FOR ADJUSTING VEHICLE LIGHTING IN RESPONSE TO CAMERA SYSTEM

(71) Applicant: Bendix Commercial Vehicle Systems LLC, Elyria, OH (US)

(72) Inventors: Andreas U Kuehnle, Villa Park, CA (US); Cathy L Boon, Orange, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/841,493

(22) Filed: Dec. 14, 2017

(51) Int. Cl.
*B60Q 1/14* (2006.01)
*B60Q 9/00* (2006.01)

(52) U.S. Cl.
CPC .............. *B60Q 1/1423* (2013.01); *B60Q 9/00* (2013.01)

(58) Field of Classification Search
CPC ...... B60Q 1/085; B60Q 1/1423; B60Q 1/143; B60Q 1/18; B60Q 2300/056; B60Q 2300/112; B60Q 2300/114; B60Q 2300/122; B60Q 2300/134; B60Q 2300/21; B60Q 2300/312; B60Q 2300/314; B60Q 2300/322; B60Q 2300/324; B60Q 2300/332; B60Q 2300/3321; B60Q 2300/333; B60Q 2300/334; B60Q 2300/335; B60Q 2300/336; B60Q 2300/41; B60Q 2300/42; B60Q 2300/45; B60Q 2400/30; G06K 9/00791; G06K 9/00825; G06K 9/2027; G08G 1/162; H01L 2224/48091; H01L 2924/00014
See application file for complete search history.

(56) References Cited

U.S. PATENT DOCUMENTS

| 4,249,160 | A  | 2/1981  | Chilvers       |
| 5,648,835 | A  | 7/1997  | Usawa          |
| 7,339,149 | B1 | 3/2008  | Schofield      |
| 7,447,581 | B2 | 11/2008 | Eberhardt      |
| 8,162,518 | B2 | 4/2012  | Schofield      |
| 9,090,205 | B2 | 7/2015  | Nagaoka et al. |

(Continued)

FOREIGN PATENT DOCUMENTS

| DE | 19902015 A1    | 7/2000 |
| DE | 102009028342 A1 | 2/2011 |

(Continued)

OTHER PUBLICATIONS

European Patent Office, "International Search Report and Written Opinion," Report, dated Mar. 20, 2019, 14 pages, Rijswijk Netherlands.

*Primary Examiner* — Alexander H Taningco
*Assistant Examiner* — Renan Luque
(74) *Attorney, Agent, or Firm* — Cheryl L. Greenly; Brian E. Kondas; Eugene E. Clair

(57) ABSTRACT

A camera controller for selectively controlling illumination around a vehicle comprises an image capture portion having a viewing area; an output for transmitting lighting control messages; and control logic. The control logic determines that a change in illumination is necessary in the viewing area and transmits a lighting control message at the output in response to the determination that illumination change is necessary. The lighting control message directs at least one lighting source associated with the vehicle in the viewing area of the camera controller to be adjusted.

15 Claims, 3 Drawing Sheets

(56) References Cited

U.S. PATENT DOCUMENTS

| | | | |
|---|---|---|---|
| 9,102,265 B2 | 8/2015 | Ehlgen et al. | |
| 9,481,292 B2 | 11/2016 | Faber et al. | |
| 9,663,023 B2 | 5/2017 | Strolz et al. | |
| 2005/0134483 A1* | 6/2005 | Monji | B60Q 1/085 340/933 |
| 2008/0130302 A1* | 6/2008 | Watanabe | B60Q 1/085 362/466 |
| 2009/0323366 A1* | 12/2009 | Furusawa | B60Q 1/143 362/466 |
| 2010/0265330 A1 | 10/2010 | Ying | |
| 2011/0280026 A1 | 11/2011 | Higgins-Luthman | |
| 2012/0116632 A1 | 5/2012 | Bechtel | |
| 2012/0271511 A1* | 10/2012 | Dierks | B60Q 1/143 701/36 |
| 2013/0242100 A1 | 9/2013 | Seki | |
| 2014/0056012 A1* | 2/2014 | Yamazaki | B60Q 1/143 362/466 |
| 2017/0083774 A1 | 3/2017 | Solar | |
| 2017/0270375 A1* | 9/2017 | Grauer | G01S 17/107 |

FOREIGN PATENT DOCUMENTS

| | | |
|---|---|---|
| DE | 102011004937 A1 | 9/2012 |
| DE | 102012210467 A1 | 12/2013 |
| EP | 1757485 A1 | 2/2007 |
| JP | 2015058747 A | 3/2015 |

\* cited by examiner

_US 10,336,243 B1_

APPARATUS AND METHOD FOR ADJUSTING VEHICLE LIGHTING IN RESPONSE TO CAMERA SYSTEM

BACKGROUND OF INVENTION

The present invention relates to embodiments of a camera system having at least one controller that is capable of adjusting vehicle lighting according to specific needs. In general, cameras require light to obtain viewable images for their own purposes. The camera may add light by lighting a flash associated with the camera itself or by opening the shutter for a longer period of time. This light may assist the camera in obtaining proper exposure but does not improve the viewing by the driver of anything in the camera's field of view. There is a need for a system to improve lighting around a vehicle equipped with cameras for convenience and safety purposes.

SUMMARY OF THE INVENTION

Various embodiments of an apparatus for selectively controlling illumination around a vehicle comprise a controller for selectively controlling illumination around a vehicle. The controller comprises an image capture portion having a viewable area, an output for transmitting lighting control messages, and control logic. The control logic determines that a change in illumination is necessary in the viewable area; and transmits a lighting control message at the output in response to the determination that illumination change is necessary. The lighting control message directs at least one lighting source associated with the vehicle to be adjusted.

In accordance with another aspect, various methods for controlling vehicle lighting comprise determining that an illumination adjustment is necessary in a viewing area of a vehicle mounted camera; and transmitting a lighting control message in response to the determination that illumination adjustment is necessary. The lighting control message specifies at least one lighting source associated with the vehicle to be adjusted.

BRIEF DESCRIPTION OF DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

INVENTION DESCRIPTION

Figure 1:
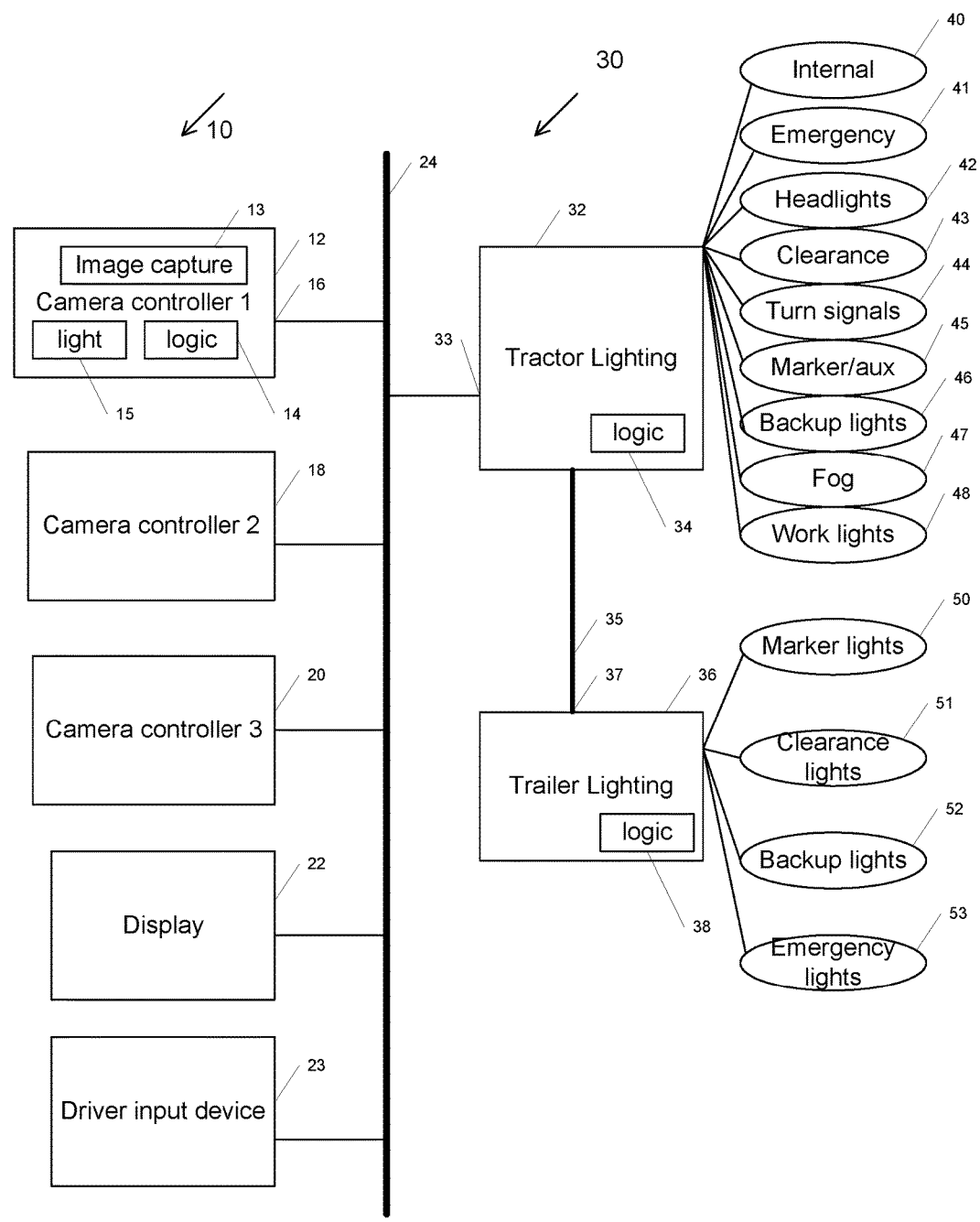
FIG. 1 illustrates camera and lighting system according to one example of the present invention.

FIG. 1 shows a camera system 10 and a lighting system 30 as implemented for a commercial vehicle. The commercial vehicle may be a tractor having at least one trailer or may be a truck only.

The camera system 10 includes at least one camera controller 12. In another embodiment, the camera system 10 includes a plurality of camera controllers, such as first camera controller 12, second camera controller 18 and third camera controller 20. The camera controllers 12, 18, 20 may be mounted on different locations of the commercial vehicle and oriented to capture a specific viewable area according to the vehicle manufacturer or vehicle owner's requirements. In one example, the first camera controller 12 may be mounted to capture a front viewable area of the vehicle, the third camera controller 20 may be mounted to capture a rear viewable area of the vehicle and the second camera controller 18 may be mounted to capture a side view of the vehicle, such as a blindspot on the passenger side of the vehicle, thereby capturing different images from around the vehicle.

The camera system 10 may also include a display 22 for displaying images to the driver of the commercial vehicle. The camera system 10 may also include a driver input device 23 for receiving requests for control of the camera system 10 from the driver. Both the display 22 and driver input device 23 can be located in the cab of the commercial vehicle.

The first camera controller 12 includes an image capture portion 13, a lighting source 15, a communications port 16 and control logic 14. The first camera controller 12 uses video signals from the image capture portion 13 to detect an object's presence, size, longitudinal distance and lateral distance with respect to the commercial vehicle. The first camera controller 12 can detect multiple stationary or moving objects within a wide range to the front and sides of the image capture portion 13.

The lighting source 15 may be part of the first camera controller 12 or may be under the direct control of the first camera controller 12. The lighting source 15 may be directed at the same field of view as the image capture portion 13. The lighting source 15 may be recessed from the image capture portion 13, closer to the body of the vehicle in order to avoid camera body shadows in the scene. The lighting source 15 may be turned on, turned off or may have intensity control capability.

The first camera controller 12 is capable of measuring available light. The first camera controller 12 may accomplish light intensity measurement through receiving a light measurement from a discrete device connected to the first camera controller 12. Alternatively, the first camera controller 12 may use the gain, exposure time, and gray level statistics to determine an available light level.

The first camera controller 12 uses the communications port 16 for transmitting messages to control lighting sources and for receiving messages to control the image capture portion 13.

The first camera controller 12 includes a processor with the control logic 14. The control logic 14 analyzes images for use in lane departure, collision mitigation and other vehicle control subsystems. The control logic 14 will also transmit the image for display on the display device 20, such as for a surround view system. The control logic 14 also determines available light for the image capture portion 13 in response to the light measurement. The control logic 14 may determine that a change in illumination is necessary to improve the visibility of the field of view of the image capture portion 13 or to highlight a potential obstacle. The control logic 14 receives control signals from the driver input device 23. The control logic 14 transmits messages at the communications port 16 to control lighting on the commercial vehicle based on the image information, light intensity measurement, ambient light and/or currently activated lighting sources. The control logic 14 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 14.

The image capture portion 13 of the first camera controller 12 may have a saturation limit, which is the point where too much light causes oversaturation of the image. In one example, the available light should be kept at about 90% to 95% of the saturation limit of the image capture portion 13. In contrast, too little light can cause undersaturation of the image such that the captured image has low contrast and may be unusable. The control logic 14 will determine whether to maintain the lighting sources in a steady state or to request a change in an output of the lighting sources based on camera information, such as the saturation limit.

The first camera controller 12 communicates with other controllers on the commercial vehicle using communication port 16, which is connected to a vehicle communications bus 24. The first camera controller 12 may communicate with the driver display 22 and the driver input device 23 using the vehicle communications bus 24. Controllers communicating on the vehicle communications bus 24 may use the SAE J1939 communication protocol or other public or private communication protocol.

The camera system 10 communicates with the lighting system 30. The lighting system 30 includes a tractor lighting controller 32. The tractor lighting controller 32 may be a stand alone controller or may be integrated into another controller, such as a safety system controller, braking system controller or the first camera controller 12. The tractor lighting controller 32 includes a communications port 33 for communicating with the vehicle communications bus 24.

The tractor lighting controller 32 includes a processor with control logic 34. The control logic 34 receives and transmits messages to control the lighting devices in and around the tractor portion of the commercial vehicle. The control logic 34 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 34.

The tractor lighting controller 32 is directly connected to at least one lighting source or communicates with several lighting sources using a communications network on the tractor of the commercial vehicle. The communications network may be a wired serial bus network using the SAE J1939 protocol, for example, or the communications may be a wireless network using a protocol such as WiFi, Bluetooth or LTE. The lighting sources controlled by the tractor lighting controller 32 may include internal vehicle lights 40, such as cab lighting. The tractor lighting controller 32 may control external lights of the tractor, such as emergency lights 41, headlights 42, clearance lights 43, turn signals 44, marker/auxiliary lights 45, backup lights 46, fog lights 47 and work lights 48. Each of the external lighting sources illuminates different sections of the tractor or areas around the tractor. Each of the lighting sources can be turned on or off by the tractor lighting controller 32. Some of the lighting sources may be capable of increasing their luminosity, dimming their luminosity or otherwise be receptive to fine control of their luminosity in response to control messages or current control.

If the commercial vehicle includes a trailer, then the lighting system 30 includes a trailer lighting controller 36. The trailer lighting controller 36 may be a stand alone controller or may be integrated into another controller on the trailer, such as a safety system controller or braking system controller. The trailer lighting controller 36 includes a communications port 37 for communicating with the tractor lighting controller 32 and other controllers and devices on the trailer and subsequent vehicles. The tractor lighting controller 32 and the trailer lighting controller 36 may communicate using a vehicle communications bus 35, which uses the SAE J2497 protocol or other protocol. The tractor lighting controller 32 and trailer lighting controller 36 may also communicate wirelessly.

The trailer lighting controller 36 includes a processor with control logic 38. The control logic 38 receives and transmits messages to control the lighting devices in and around the trailer. Controlling the lighting devices includes turning the lights on or off or adjusting the lighting intensity. The control logic 38 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 38.

The trailer lighting controller 36 is directly connected to at least one lighting source or communicates with several lighting sources on the trailer using a communications network. The communications network may be a wired serial bus network using the SAE J1939 or SAE J2497 protocol, for example. The communications may be a wireless network using a protocol such as WiFi, Bluetooth or LTE. The lighting sources controlled by the trailer lighting controller 36 may include marker lights 50, clearance lights 51, backup lights 52 and emergency lights 53. Each of the lighting sources illuminates different sections on the trailer or around the trailer. Each of the lighting sources can be turned on or off by the trailer lighting controller 36. Some of the lighting sources may be capable of increasing their luminosity, dimming their luminosity or otherwise be receptive to fine control of their luminosity in response to control messages or current control.

In one example, the first camera controller 12 monitors its own captured images for low image quality due to insufficient brightness of the image. The first camera controller 12 will turn on lighting source 15 or send control messages via the vehicle communications bus 24 to the tractor lighting controller 32 in an effort to improve the image quality by changing the available light. In another example, the tractor lighting controller 32 monitors the vehicle communications bus 24 for the low voltage differential signaling (LVDS) in the pixel stream as transmitted from the first camera controller 12. If the LVDS indicates low image intensity, the tractor lighting controller 32 may independently activate a lighting source associated with the image area of the first camera controller 12 to improve the illumination in and around the viewable area to be captured in an image.

Therefore, an apparatus for selectively controlling illumination around a vehicle comprises an image capture portion having a viewing area; an output for transmitting lighting control messages; and control logic. The control logic determines that a change in illumination is necessary in the viewing area and transmits a lighting control message at the output in response to the determination that illumination change is necessary. The lighting control message directs at least one lighting source associated with the vehicle in the viewing area of the camera controller to be adjusted.

Turning on or increasing the illumination of a lighting source can brighten an image captured by a nearby camera or cameras. However, some lighting sources may be more effective at brightening the viewable area and subsequent captured image than others, based on their intensity and illumination patterns. To evaluate the brightness in each image, each camera controller includes a known gray level at which below this level, the image may be difficult to interpret. In one example, the average image gray level is between 10% and 20% for an image captured by image capture portion 13 of first camera controller 12. An increase of 30-40% is needed to increase the average image gray level to a desired level of 50%. The first camera controller 12 therefore sends a control message proportional to the gray level deviation to the lighting sources that are capable of illuminating the viewable area of the first camera controller 12 because of their location on the vehicle and/or luminosity. A degree of proportionality can be measured or determined previously, and may vary for each pairing of a camera controller and lighting source. It is possible that the lighting source(s) may be requested to emit a maximum luminosity, for instance when a dark, non-reflective, scene area is desired to be illuminated. An example of a dark, non-reflective material is a black towel, optical matte black paint, or an object coated with Vantablack. Other image brightness statistics can be used, such as the coarsely binned mode.

Figure 2:
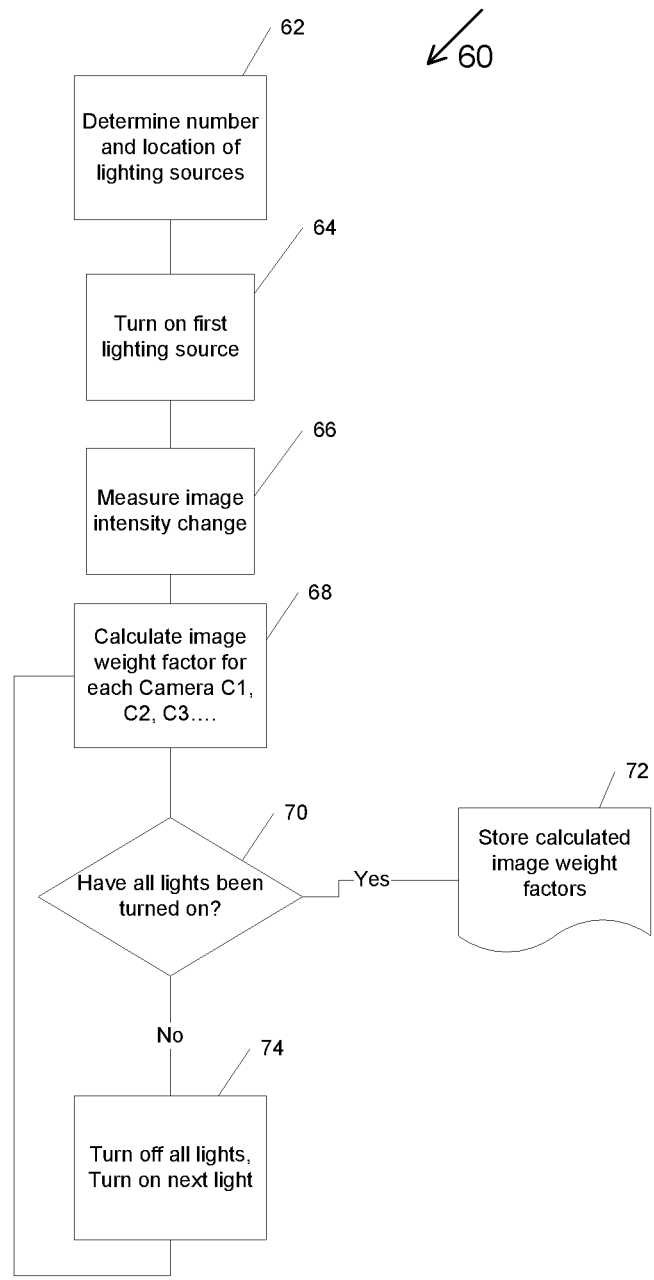
FIG. 2 illustrates a method of calibrating a camera and lighting system according to an example of the present invention.

FIG. 2 illustrates a method 60 of calibrating the lighting system 30 using the camera system 10 and lighting system 30 of the present invention. Calibration of the lighting system 30 is preferably done in a setting where natural light is minimized so that the effect of each lighting source of the commercial vehicle to each camera controller can be measured effectively. Calibration can be completed by the original equipment manufacturer in a manufacturing plant or by a vehicle maintenance technician in a maintenance garage.

In step 62, the number and location of all of the lighting sources on the commercial vehicle are determined. The number and location of all the lighting sources on the commercial vehicle may be preprogrammed into the tractor lighting controller 32 or may be set up during end of line testing of the commercial vehicle at the manufacturing plant.

In step 64, the first lighting source is turned on. In one example, the lighting source with the greatest luminosity within a viewable area of the first camera controller 12 may be turned on first. In one example, the first lighting source illuminated may be the headlights 42, when the first camera controller 12 is a forward facing camera. In contrast, a headlight will not be the first lighting source turned on if the rear facing camera, the third camera controller 20, is being tested. In another example, the lighting source having the greatest luminosity may be preprogrammed in the first camera controller 12 or the tractor lighting controller 32. Alternatively, the lighting source having the greatest luminosity may be determined over time based on the brightness change in subsequent captured images. The first camera controller 12 may transmit the control message to request that the first lighting source be turned on directly to the first lighting source or the tractor lighting controller 32 may transmit the control signal to the first lighting source after receiving the control message from the first camera controller 12.

In a step 66, the image intensity change is measured. As the lighting source changes from 0 to 100, where 0 corresponds to the lighting source being off and 100 corresponds to the lighting source being fully on, the average gray level of the image may change from 120 to 160. The image gray level to light sensitivity factor is calculated as:

$$(160-120)/(100-0)=0.4$$

This weighting factor, or sensitivity factor or proportionality factor, may now be used to determine what change in the lighting source luminosity is needed to come nearer to a desired image gray level. This change will vary with imager gain and exposure. The fundamental proportional control scheme described here will lead to convergence via negative feedback.

In one example, the lighting source, such as headlights 42, illuminates a viewable area in a known pattern. The resulting illumination will typically be brightest in a center of a grid and gradually decrease outward from the center point. In another example, the ground points of the first camera controller 12 are monitored. By activating each lighting source individually, the influence of each lighting source at each grid point within the camera image is estimable using the gray levels and can be assigned a weighting factor. The known weighting factors can be used to adjust the level of illumination from each lighting source as the camera system 10 is in operation.

In the opposite sense, image brightness may be desired to be kept to a minimum. In one example, the maximum image brightness is not allowed to exceed about 90% to 95%. The lighting sources will be adjusted so as to keep the level of illumination below this maximum image brightness level.

In step 68, an image weight factor is determined for first camera controller 12. Assuming a desired increase in the average camera gray level from a nominal percentage, say 12%, this value is multiplied by the associated weight factor W, and added to a current lighting control value (e.g. 54%, where this value is a percentage of the maximum light intensity). The equation becomes 54%+12%*W. If the result is greater than 100%, then the control value is capped at 100%.

In step 70, the first camera controller 12 determines if all of the lighting sources that would affect the viewable area of its image capture portion 13 have been illuminated. If yes, then the calculated image weight factors are stored in step 72. If all of the lighting sources have not yet been turned on at least once, the method 60 continues in step 74 where the first camera controller 12 sends a control message to turn off all lights that are on. The first camera controller 12 will then send a control message to turn on the next lighting source in the sequence of either nearest to the first camera controller 12 or the next greatest luminosity lighting source. The method 60 then returns to step 68.

The method 60 repeats for each camera controller. Alternatively, during step 68, each camera controller calculates the image weight factor while a particular lighting source is illuminated, even if that lighting source is not proximate to the camera controller. One lighting source change may affect multiple camera controllers.

In another example, the method 60 may take into account articulation of the tractor with respect to the trailer. The image weight factor may then also include an angle that corresponds to the articulation of the tractor and trailer at the time the image weight was calculated. When the angle is known, the image weight factor will be changed.

The calibration method 60 may need to be repeated each time the vehicle is powered. However, if the tractor remains connected to the same trailer and no lighting source changes have been made, such as replacing a bulb, the method 60 may not need to be repeated at each power on cycle.

In another example, the calibration method 60 may only take place in the interaction zones between a tractor camera system, a trailer camera system and the lighting systems. Only those camera controllers that view or illuminate the area near the vehicle segmented area may need to be calibrated.

If the method 60 cannot be certain of a reasonable even reflectivity in the area being illuminated by the lighting source, then the method 60 may be repeated a number of times to obtain a statistical representation of the value of the weight factor. Surface reflectivity varies between 0 to about 100%. The change in gray level in an image as the lighting is varied depends on the reflectivity of what is being illuminated. For instance, fully illuminating a very dark surface, such as a black towel, optical matte black paint, or an object coated with Vantablack, will lead to only a small or negligible change in the light energy reaching the camera image portion, thereby producing only a small change in image gray level. It is therefore desirable, when the current area of illumination may not be representative of normal values, to repeatedly perform the above weighting factor calculation and average the results.

Due to the variation in reflectivity of what is being illuminated, the proportional control scheme described herein is approximate. Because the scheme has negative feedback, the scheme will self-correct with an overilluminated scene creating a reduction in lighting intensity. A variation of the embodiment adds an integral control element (proportional integral control) to the feedback loop, thereby further stabilizing system behavior.

The derivation of the control signals for setting lighting intensity can be arranged into matrix form. The contribution of a light source to increasing the average gray level of a camera's image is expressed by a weighting factor. For example, if the image average gray level is increased by 5 steps, then the factor is 5. A linear relationship can be presumed between the control signal and the gray level, so that, for example, a camera to light relationship would have a gray level increase of 2.5 gray levels with the lighting set to half intensity.

The weighting factors are assembled in a matrix, indexed by light source number in the columns, and camera average gray level in the rows:

Weight factor (image 1, light 1) weight factor (image1, light 2) . . . .

Weight factor (image 2, light 1) weight factor (image2, light 2) . . . .

The weight factor may be denoted by W. The light source control signals, which are unknown, are limited to be between 0 and 1 and are denoted by column vector x. The deviation of a camera's average gray level from the desired value is denoted by d. The additivity of the light sources to the average image gray level may be given as the formula:

$$Wx=d$$

Standard linear algebra, or constrained optimization methods, may be used to solve for x, the desired light control signal values.

Therefore, a method of calibrating a camera system with a lighting system on a commercial vehicle comprises determining a change to the image intensity and image weight factor for each lighting source on a vehicle.

Figure 3:
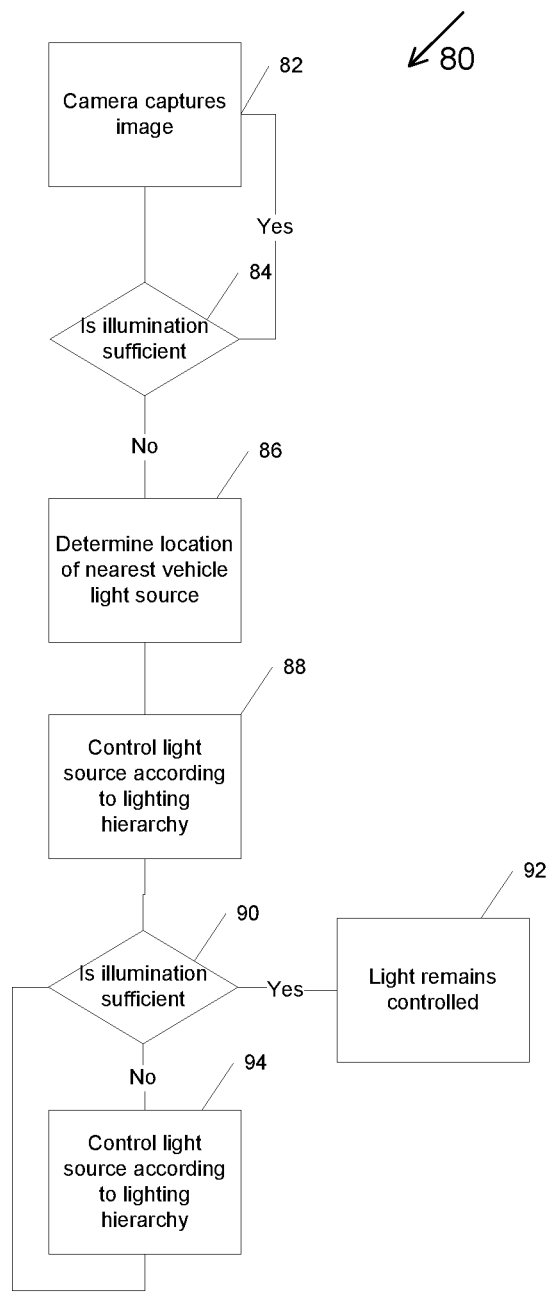
FIG. 3 illustrates a method of operating a camera and lighting system according to an example of the present invention.

FIG. 3 illustrates a method 80 of controlling the lighting system 30 using the camera system 10 of the present invention. In step 82, the first camera controller 12 captures an image. In step 84, the control logic 14 of the first camera controller 12 evaluates whether the illumination of the captured image is sufficient. If the illumination is sufficient such that image visibility of object is achieved and/or entire dynamic range of imager is used, the method 80 returns to step 82 and continues to capture images. It is desired that as few as possible undersaturated or oversaturated portions of each image exist.

If the control logic 14 determines that the illumination of the captured image is not adequate, the method 80 continues to step 86. An inadequate image may include not enough light or too much light in the captured image. In step 86, the control logic 14 determines which lighting source of the vehicle is nearest to or within the viewable area of the first camera controller 12. The control logic 14 may include its own database of lighting sources available on the vehicle. Alternatively, the first camera controller 12 may communicate with the tractor lighting controller 32 to determine what lighting sources are available on the vehicle that will affect the viewable area of the first camera controller 12.

In step 88, the control logic 14 selects and controls the lighting source either directly or via control messages on the vehicle communications bus 24 to the tractor lighting controller 32. The tractor lighting controller 32 may communicate with the trailer lighting controller 36 (if present) using the vehicle communications bus 35. In another example, the control logic 14 may send a control message on the communications bus 24 and the tractor lighting controller 32 determines which lighting source best meets the need for the change in illumination. The control message may include not just a request to turn off and on the light source, but also may select individual lighting sources and change the luminosity of the lighting source. Lighting luminosity may be changed by providing additional voltage to an LED lighting source, for example. In another example, the control logic 14 may request strobing of the selected lighting source to increase illumination of the image. The strobing of the selected lighting source may occur by adjusting the lighting source's on time versus the off time and would occur at a frequency imperceptible to the human eye. Therefore, the lighting control message will signal a change proportional to the deviation from a desired image characteristic.

In step 90, an additional image is captured and the illumination is checked for sufficiency again. If the illumination is now sufficient, the method 80 continues to step 92. The lighting source remains under control of the first camera controller 12 in step 92 for as long as the first camera controller 12 is capturing images at that location.

If the illumination of the captured image is still determined not to be sufficient, the method 80 continues with step 94 to additionally control the selected lighting source by changing its luminosity. Alternatively, other lighting sources may be added or removed from the control matrix. The method 80 returns to step 90 to determine if the illumination is sufficient.

Alternatively, the control logic 14 may determine that an object is in the captured image, but that the illumination in the captured image may not be sufficient for displaying to the driver on the display 22. In this case, the control logic 14 changes the lighting source to better illuminate the object for display on the display 22. Therefore, the driver's actionable field of view is increased when he is using the display for collision avoidance or backup maneuvers, for example.

Based on the placement of each camera controller 12, 18, 20, an increase in one camera's image brightness may lead to another camera becoming saturated in part of its image.

To solve this problem, a central controller may be added to the camera system 10. The central controller would examine the image statistics of each camera controller 12, 18, 20. The central controller would be able to balance the overall illumination to mitigate saturation of any single camera controller's image.

In one illustrative example, a commercial vehicle having the camera system 10 and lighting system 30 according to the present invention is prepared to move in reverse toward a loading dock. The third camera controller 20 is a rear facing camera on the tractor. The third camera controller 20 attempts to capture an image of the viewable area of the third camera controller 20 as soon as the reverse gear is enabled. If the third camera controller 20 determines that the illumination is insufficient, the third camera controller 20 will send a lighting control message to the tractor lighting controller 32 via the vehicle communications bus 24. The tractor lighting controller 32 may also send control messages to the trailer lighting controller 36 via the vehicle communications bus 35 or other communications means. The lighting control message will include information regarding the need for increased illumination in the viewing area of the third camera controller 20 in order to capture the rear view of the tractor and trailer. In response, the trailer lighting controller 36 may turn on the trailer backup lights 52, if they are not already on. If the third camera controller 20 determines that the trailer backup lights 52 are not providing sufficient illumination, the third camera controller 20 will continue to send a lighting control message to be received by both the tractor lighting controller 32 and the trailer lighting controller 36. The trailer lighting controller 36 may increase the intensity of the trailer backup lights 52 if possible. If the illumination is still not sufficient, the third camera controller 20 will continue to transmit the lighting control messages requesting increased illumination. The tractor lighting controller 32 may receive this message and in turn may turn on the tractor backup lights 46 to try and aid in the illumination spectrum of the third camera controller 20. Other lights may be turned on by the tractor lighting controller 32 and trailer lighting controller 36 such as turn signals 44, marker lights 50 etc. until the third camera controller 20 determines that the illumination is sufficient.

If an obstacle, such as a pole, is identified in the captured image by third camera controller 20, the third camera controller 20 may request additional illumination to help the driver of the commercial vehicle identify and avoid the obstacle. The additional illumination may be up to the saturation limit of the camera portion of the third camera controller 20. The illumination should also be sufficient to display the object on the display device 22 for the driver. The obstacle may be focused on by a lighting source so that the light intensity is greater on the obstacle than throughout the rest of the captured image. This can be accomplished by a combination of lighting sources being illuminated, intensified or strobed by the trailer lighting controller 36 and/or tractor lighting controller 32.

In another example, the driver of the commercial vehicle may recognize the obstacle and request additional lighting in the camera image via the driver input device 23. The third camera controller 20 accommodates the driver request while keeping the image capture portion under the saturation limit.

Therefore, a method of determining that an illumination adjustment is necessary in a viewing area of a vehicle mounted camera includes transmitting a lighting request at the output in response to the determination that illumination adjustment is necessary. The lighting request specifies at least one lighting device associated with the vehicle to be adjusted. The images are continually monitored to ensure that the illumination is sufficient.

When an illumination adjustment is necessary in a viewing area of a vehicle mounted camera; the camera controller transmits a lighting control message in response. The lighting control message specifies at least one lighting source associated with the vehicle to be adjusted.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed:

1. A controller for selectively controlling illumination around a vehicle comprising:
    an image capture portion having a viewable area;
    an output for transmitting lighting control messages; and
    a control logic, the control logic
        determining an image weight factor using a plurality of lighting sources, a first lighting source of the plurality of lighting sources being one of an emergency light, a clearance light, a fog light, a work light, a marker light, a turn signal and a backup light;
        determining that a change in illumination is necessary in the viewable area to balance the illumination for the image capture portion;
        determining the first lighting source of the plurality of lighting sources affects the change in illumination based on the image weight factor;
        transmitting a first lighting control message at the output in response to the determination that the change in illumination is necessary; wherein the first lighting control message directs the first lighting source associated with the vehicle to be adjusted;
        determining that the change in illumination affected by the first lighting source is not sufficient to balance the illumination;
        determining a second lighting source of the plurality of lighting sources affects the change in illumination based on the image weight factor; and
        transmitting a second lighting control message at the output to the second lighting source wherein the second lighting control message directs the second lighting source to be adjusted to balance the illumination.

2. The controller as in claim 1, wherein the first lighting control message includes one of an increase in light intensity or a decrease in light intensity of the first lighting source.

3. The controller as in claim 2, wherein the lighting control messages further includes a value of light luminosity requested.

4. The controller as in claim 1, wherein the determining that a change in illumination is necessary includes the detection of an obstacle in the viewable area.

5. The controller as in claim 1, wherein the adjustment of the first lighting source remains within a saturation limit of the image capture portion.

6. The controller as in claim 1, wherein the adjustment of the first lighting source increases an area of actionable field of view time of the driver of the vehicle.

7. The controller as in claim 1, wherein the lighting control messages directs a strobing of the first lighting source.

8. The controller as in claim 1, wherein the controller determines a lighting saturation limit has been reached in response to the first lighting source being turned on and transmits another lighting message to adjust the first lighting source.

9. The controller as in claim 1, further comprising an input for measuring light intensity in the viewable area, wherein the controller determines an illumination adjustment is necessary in response to the measured light intensity indicating a low light intensity.

10. A system for controlling vehicle lighting comprising:
a lighting controller;
at least one lighting source in communication with the lighting controller; and
a plurality of camera controllers in communication with the lighting controller;
wherein the camera controller
determines an image weight factor using the at least one lighting source, wherein the at least one lighting source is one of an emergency light, a clearance light, a fog light, a work light, a marker light, a turn signal and a backup light;
determines that illumination adjustment is necessary in a location within the at least one of the plurality of camera controllers viewing area to balance the illumination for the at least one of the plurality of camera controllers;
transmits a lighting control message specifying the at least one lighting source to be adjusted to the lighting controller in response to the determination that illumination increase is necessary and the at least one lighting source affects the illumination increase based on the image weight factor; wherein the lighting controller selectively adjusts the at least one light source in response to the lighting request;
determines that the illumination increase is not sufficient to balance the illumination for the at least one of the plurality of camera controllers;
determines a second lighting source, separate from the at least one lighting source, affects the illumination increase based on the image weight factor; and
transmits a second lighting control message to the second lighting source, wherein the second lighting control message directs the second lighting source to be adjusted to balance the illumination.

11. The system as in claim 10 wherein the lighting controller and the at least one camera controller communicate on a vehicle communications bus.

12. The system as in claim 10 wherein the lighting controller and the at least one camera controller are integrated in a single controller.

13. A method for controlling vehicle lighting comprising:
determining an image weight factor using at least one lighting source;
determining that an illumination adjustment is necessary in a viewing area of a vehicle mounted camera to balance the illumination for the vehicle mounted camera;
transmitting a lighting control message in response to the determination that illumination adjustment is necessary; wherein the lighting control message specifies the at least one lighting source associated with the vehicle to be adjusted in response to the at least one lighting source affecting the illumination adjustment based on the image weight factor;
determining that the illumination adjustment is not sufficient to balance the illumination;
determining a second lighting source, separate from the at least one lighting source, affects the change in illumination based on the image weight factor; and
transmitting a second lighting control message to the second lighting source wherein the second lighting control message directs the second lighting source to be adjusted to balance the illumination.

14. The method as in claim 13, further specifying the intensity of a light required.

15. The method as in claim 13, wherein the determining that illumination adjustment is necessary further includes the detection of an obstacle in the viewing area.

* * * * *